(12) United States Patent
Gadgil et al.

(10) Patent No.: US 9,997,078 B2
(45) Date of Patent: Jun. 12, 2018

(54) OBSTACLE DETERMINATION AND DISPLAY SYSTEM

(71) Applicant: Garmin International, Inc., Olathe, KS (US)

(72) Inventors: Anup A. Gadgil, Overland Park, KS (US); Joseph L. Komer, Shawnee, KS (US)

(73) Assignee: Garmin International, Inc., Olathe, KS (US)

( * ) Notice: Subject to any disclaimer, the term of this patent is extended or adjusted under 35 U.S.C. 154(b) by 0 days. days.

(21) Appl. No.: 15/261,492

(22) Filed: Sep. 9, 2016

(65) Prior Publication Data
US 2018/0075762 A1    Mar. 15, 2018

(51) Int. Cl.
*B64D 43/02*    (2006.01)
*G08G 5/04*    (2006.01)
*B64D 45/08*    (2006.01)

(52) U.S. Cl.
CPC ............ *G08G 5/04* (2013.01); *B64D 43/02* (2013.01); *B64D 45/08* (2013.01)

(58) Field of Classification Search
USPC .... 701/3, 300, 120, 23, 7, 17, 24, 121, 301; 342/29, 30, 5; 340/945, 931
See application file for complete search history.

(56) References Cited

U.S. PATENT DOCUMENTS

| | | | | |
|---|---|---|---|---|
| 3,652,981 A | * | 3/1972 | Campanella | G01S 13/9303 340/961 |
| 3,668,403 A | * | 6/1972 | Meilander | G01S 13/9303 342/36 |
| 4,424,038 A | * | 1/1984 | Tingleff | G09B 9/40 434/2 |
| 5,122,801 A | * | 6/1992 | Hughes | G01S 7/021 342/13 |
| 5,163,176 A | * | 11/1992 | Flumerfelt | G01S 7/2813 342/174 |
| 5,359,542 A | * | 10/1994 | Pahmeier | B25J 9/1615 356/621 |

(Continued)

OTHER PUBLICATIONS

U.S. Appl. No. 15/005,422, filed Jan. 25, 2016.

(Continued)

*Primary Examiner* — Richard A Goldman
(74) *Attorney, Agent, or Firm* — Samuel M. Korte; Max M. Ali

(57) ABSTRACT

An obstacle avoidance system is provided to assist a pilot in avoiding obstacles. The obstacle avoidance system includes a set of proximity sensors and a pilot interface device. The set of proximity sensors detects nearby obstacles by emitting a signal and receiving a reflected signal from an obstacle. A processor receives an obstacle indication from the set of proximity sensors and detects the obstacle that is in proximity to the aircraft based at least in part on the reflected signal. The processor acquires a distance and a direction to the obstacle and calculates a threat level posed by the obstacle. The pilot interface device is operable to display the following: an ownship icon indicative of the aircraft, a velocity vector icon indicative of a velocity vector of the aircraft, and an obstacle graphic indicative of the distance, direction, and threat level of the obstacle.

18 Claims, 8 Drawing Sheets

(56) References Cited

U.S. PATENT DOCUMENTS

| | | | | |
|---|---|---|---|---|
| 5,408,541 | A * | 4/1995 | Sewell | G01S 7/486 348/144 |
| 5,555,175 | A * | 9/1996 | D'orso | G08G 5/0086 701/301 |
| 5,872,526 | A * | 2/1999 | Tognazzini | G08G 5/0078 340/961 |
| 6,218,961 | B1 * | 4/2001 | Gross | B60T 7/22 246/122 R |
| 6,266,588 | B1 * | 7/2001 | McClellan | G01D 9/005 180/274 |
| 6,314,366 | B1 * | 11/2001 | Farmakis | B60R 25/102 340/961 |
| 6,539,291 | B1 * | 3/2003 | Tanaka | G01S 13/953 244/75.1 |
| 6,678,394 | B1 * | 1/2004 | Nichani | G05D 1/0251 348/169 |
| 7,379,165 | B2 | 5/2008 | Anderson et al. | 356/5.05 |
| 7,796,470 | B1 * | 9/2010 | Lauder | F41H 11/00 367/127 |
| 7,932,853 | B1 * | 4/2011 | Woodell | G01S 7/10 342/26 B |
| 2001/0013836 | A1 * | 8/2001 | Cowie | G08G 5/0086 340/961 |
| 2003/0016158 | A1 * | 1/2003 | Stayton | G08G 5/0008 342/29 |
| 2003/0137444 | A1 * | 7/2003 | Stone | G08G 5/0008 342/30 |
| 2004/0140912 | A1 * | 7/2004 | Alfredsson | G01C 23/00 340/945 |
| 2005/0035898 | A1 * | 2/2005 | Shiomi | G08G 5/0052 342/36 |
| 2005/0181808 | A1 | 8/2005 | Vaudreuil | 455/456.3 |
| 2005/0275582 | A1 * | 12/2005 | Mohan | G01S 7/414 342/13 |
| 2009/0186633 | A1 | 7/2009 | Yonker et al. | 455/456.6 |
| 2010/0039310 | A1 * | 2/2010 | Smith | G01S 7/062 342/29 |
| 2011/0006943 | A1 * | 1/2011 | Shaffer | G01S 17/933 342/146 |
| 2013/0321194 | A1 | 12/2013 | Kirk et al. | 342/29 |
| 2014/0142838 | A1 * | 5/2014 | Durand | G08G 5/04 701/301 |
| 2015/0193101 | A1 * | 7/2015 | Mannon | G01C 23/00 715/771 |
| 2015/0194059 | A1 * | 7/2015 | Starr | G06F 3/0484 701/3 |
| 2015/0194060 | A1 * | 7/2015 | Mannon | G08G 5/0078 701/301 |
| 2016/0052641 | A1 * | 2/2016 | Olofinboba | G08G 5/0013 340/978 |
| 2016/0209266 | A1 * | 7/2016 | McNeish | G01J 1/4257 |

OTHER PUBLICATIONS

Croft, John; Car Radio System Key to Wingtip Protection; Honeywell eyes automobile radar to address aircraft ramp collision problems; Aviation Week & Space Technology; published Jan. 13, 2014.

Garmin G1000® Pilot's Guide for Cessna Nav III, dated Nov. 2005.

* cited by examiner

OBSTACLE DETERMINATION AND DISPLAY SYSTEM

BACKGROUND

Pilots of both fixed- and rotary-wing aircraft avoid obstacles. A pilot typically avoids obstacles during flight by performing visual detection and map detection. Visual detection is the pilot looking around for obstacles. Low-light and low-visibility conditions may make visual observation of obstacles difficult. Additionally, if the aircraft is moving in a direction in which the pilot has limited visibility (partially obstructed), such as straight downward (directly below) or backwards for rotary-wing aircraft (e.g., a helicopter), adequate visual observation of potential obstacles may be difficult. Map detection is typically based on a determined location information and stored map data, such as a Terrain Awareness and Warning System ("TAWS"). An obstacle avoidance technique reliant on TAWS is limited by the contents of the available map data.

SUMMARY

In embodiments of the invention, an obstacle avoidance system is provided to assist a pilot in avoiding obstacles. The obstacle avoidance system comprises one or more proximity sensors and a pilot interface device. For instance, a set of proximity sensors may detect an obstacle near the aircraft by emitting a signal in an area and receiving a reflection of the signal from the obstacle located in the area. A processor receives an obstacle indication from the set of proximity sensors and detects the obstacle that is in proximity to the aircraft based at least in part on the reflected signal. The processor acquires a distance and a direction to the obstacle, and calculates a threat level posed by the obstacle. The pilot interface device is operable to display one or more of the following: an ownship icon indicative of the aircraft, a velocity vector icon indicative of a velocity vector of the aircraft, and/or an obstacle graphic indicative of the distance and the direction to the obstacle. The obstacle graphic includes information indicative of the threat level. The pilot interface device may also provide other audio and visual warnings to the pilot to assist the pilot in avoiding the obstacle.

This Summary is provided solely to introduce subject matter that is fully described in the Detailed Description and Drawings. Accordingly, the Summary should not be considered to describe essential features nor be used to determine a scope of the claims.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be appreciated that while the following disclosure refers to aircraft, embodiments of the invention may be utilized with other types of vehicles. In some exemplary embodiments of the invention, the obstacle avoidance system interacts with a boat, a spacecraft, a missile, or other vehicle. It should therefore be noted that throughout the description, "aircraft" could be replaced with "boat," "spacecraft," "missile," "vehicle," or the like; and "pilot" could be replaced with "sailor," "captain," "helmsman," "astronaut," or the like. In some embodiments, such as with a missile or unmanned aerial vehicle, the pilot may be remote from the vehicle.

Exemplary Environment

Figure 1:
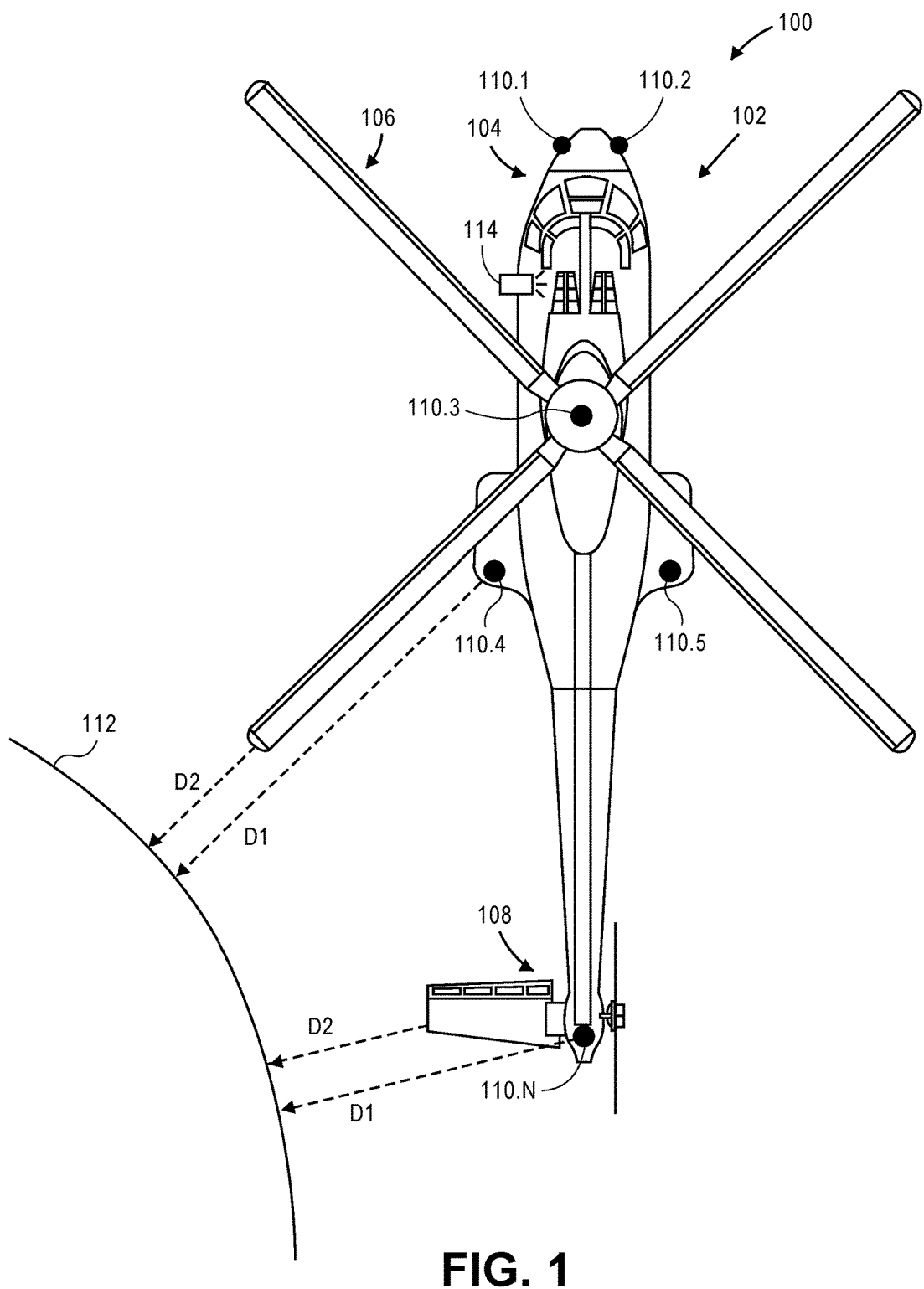
FIG. 1 is an illustration of an exemplary aircraft, namely a helicopter, equipped with a set of proximity sensors and a pilot interface device.

Embodiments of the invention may be used in an environment of an aircraft 100. As illustrated in FIG. 1, in some embodiments the aircraft 100 may be a helicopter 102 or other rotary-wing aircraft, such as an unmanned aerial vehicle. The helicopter 102 generally includes a fuselage 104, a set of rotors 106, and a tail 108. The helicopter 102 may also include a set of proximity sensors 110 (labeled in FIG. 1 as 110.1-110.N) for the detection of an obstacle 112 near the helicopter 102. The fuselage 104 may include an engine, a cockpit, a transmission, a fuel system, a control system, landing gear, and the like. A pilot interface device 114, for displaying and alerting the pilot to the obstacle 112, may be disposed within the cockpit of the fuselage 104. The set of rotors 106 generates the lift that elevates the helicopter 102. The set of rotors 106 may include a rotor mast and a plurality of main rotor blades. The set of rotors 106 is powered by the engine. The tail 108 may include a tail boom, a tail rotor, and a tail stabilizer.

In various embodiments, helicopter 102 may include any suitable number N of proximity sensors 110, which may be installed at various locations of helicopter 102. In embodiments of the invention, the proximity sensors 110 are disposed around a perimeter of the helicopter 102 to detect obstacles 112 located in any area around helicopter 102. Proximity sensors 110 may be installed (e.g., mounted) at locations in helicopter 102 to advantageously provide proximity detection data for those portions of helicopter 102 that are most likely to be damaged by a collision into one or more obstacles 112. For example, as shown in FIG. 1, proximity sensors 110.1 and 110.2 may be installed on or in a nose section of the fuselage 104 and oriented generally forward; proximity sensor 110.3 may be installed on the rotor mast of the set of rotors 106 and oriented upward; proximity sensors 110.4 and 110.5 may be installed on thrusters of the fuselage 104 and oriented laterally; and proximity sensor 110.N may be installed on the tail 108 and oriented backward. Additional proximity sensors (not illustrated) may be installed on a bottom side of the fuselage 104 and oriented downward, and located between the illustrated proximity sensors 110.1-110.N. The individual proximity sensors 110 are discussed in more detail below with regard to FIG. 5.

In embodiments of the invention, the set of proximity sensors 110 is configured to emit a signal in an area and receive a reflection of the signal from an obstacle 112 located in the area. The emitted signal may be a radar signal, an infrared signal, a sonar signal, an energized beam, an ultraviolet signal, or other electromagnetic or physical signal. In some embodiments of the invention, the set of proximity sensors 110 may include a plurality of types of sensors that utilize any or all of the above-discussed types of signals. The set of proximity sensors 110 may alternatively or additionally include a camera for the detection of visible light. Typically, each proximity sensor will be oriented relative to the aircraft 100 outward in a certain range or field. The proximity sensor can therefore emit signals and receive reflected signals along a field that fans out from the proximity sensor. The set of proximity sensors 110 therefore forms an overlapping coverage around at least a portion of a perimeter of the aircraft 100. The perimeter of the aircraft 100 may include overlapping coverage horizontally (e.g., about the yaw axis). The perimeter of the aircraft 100 may also include overlapping coverage vertically (e.g., about the roll and/or the pitch axes). However, it should be appreciated that the perimeter of the aircraft 100 is not typically a circle.

Figure 2:
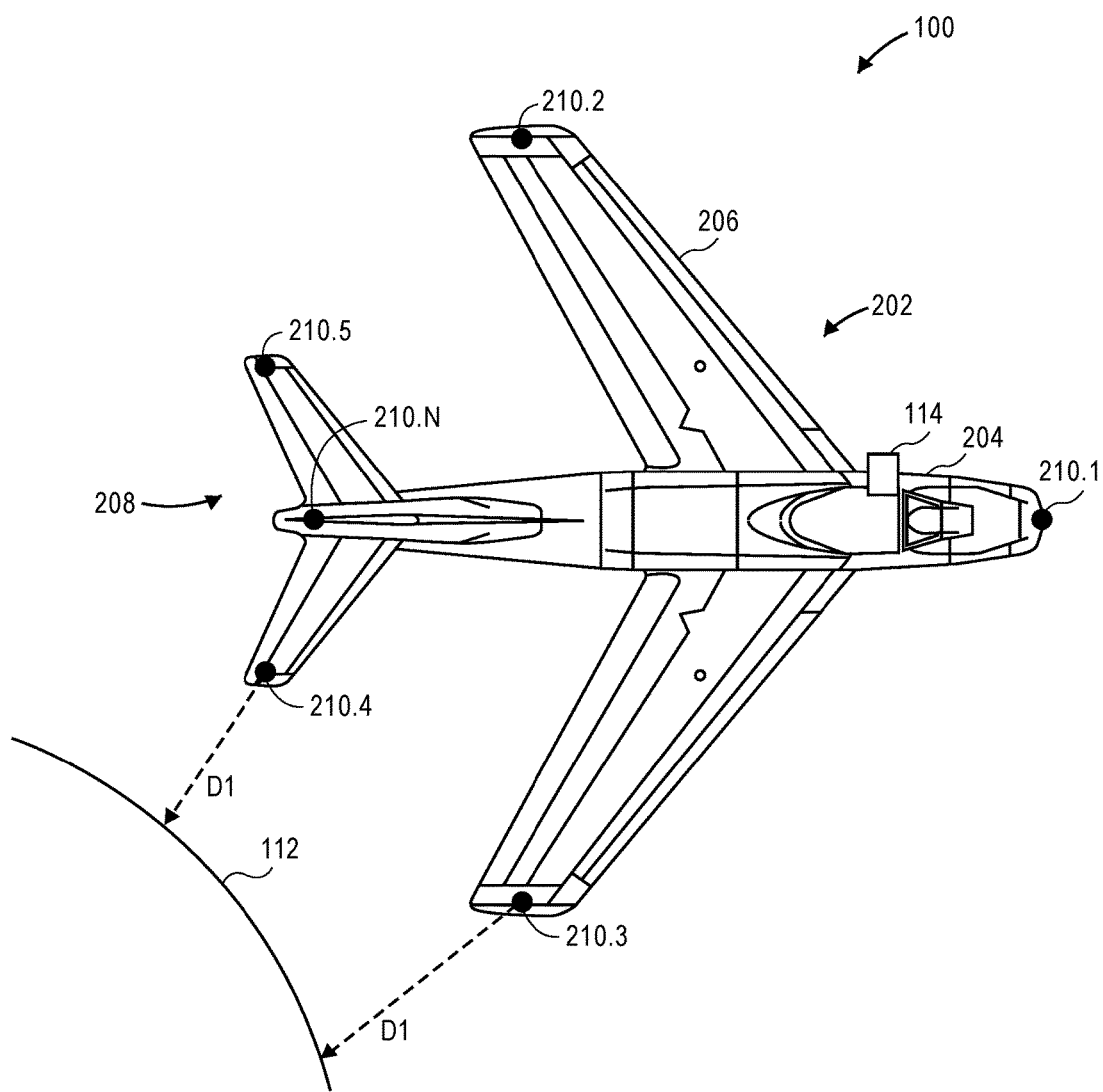
FIG. 2 is an illustration of an exemplary aircraft, namely an airplane, equipped with the set of proximity sensors and the pilot interface device.

Signals reflected by the set of proximity sensors 110 are analyzed to detect distance and direction from the helicopter 102 and obstacles 112. Typically, the distance D1 (from the proximity sensor 110 to the obstacle 112, as illustrated as FIG. 1 and FIG. 2) is detected by analyzing the timing of the reflected signal, and the direction is detected by the angle at which the reflected signal is received. In embodiments of the invention, the analysis of the reflected signals may be performed locally within the proximity sensor, at a proximity sensor control unit, at the pilot interface device, or at another aircraft system. This analysis determines the distance and direction to the obstacle 112 as measured from the respective proximity sensor. Multiple proximity sensors 110 may also detect the obstacle 112 simultaneously, as illustrated in FIG. 1 and FIG. 2. As such, the true position of the obstacle 112 relative to the aircraft 100 is also calculated, including a distance D2 from the obstacle to the nearest component of the aircraft 100. The distance D2 is calculated by the processor determining the distance from the proximity sensor to the nearest component of the aircraft at the reflected angle (or a parallel angle, as shown in FIG. 1). In some embodiments, a distance D2 is not calculated, such as in FIG. 2 where the proximity sensor 110 is in the nearest (or substantially nearest) component to the obstacle 112. As used herein, "distance" may refer to the distance D1 and/or the distance D2. The set of proximity sensors 110 may also detect breadth of an obstacle 112 and a relative altitude of the obstacle 112 relative to the respective proximity sensor. The breadth and the relative altitude may be measured directly or indirectly by calculating the locations of endpoints of the obstacle 112.

In various embodiments, one or more of proximity sensors 110 may utilize frequencies that are mostly unaffected by non-metallic aircraft construction materials, such as fiberglass, for example. In accordance with such embodiments, one or more of proximity sensors 110 may be mounted inside wingtips, fairings, etc., thereby allowing their installation without changing the shape or structure of the components of helicopter 102.

In some embodiments, one or more of proximity sensors 110 may include various components integrated as part of each respective proximity sensor 110, such as a motion sensor configured to detect the motion of helicopter 102 and/or a dedicated battery. These embodiments may be particularly useful when a modular installation is desired for each of proximity sensors 110. In other embodiments, one or more proximity sensors 110 may share various components, such as motion sensors and/or dedicated batteries, which may be installed at any suitable location within helicopter 102 or be included with the modular installation of one or more of proximity sensors 110. In embodiments of the invention, the set of proximity sensors 110 is operable to activate automatically upon at least one of a detected movement of the aircraft 100; a location of the aircraft 100 relative to an airport; a location of the aircraft 100 relative to a pre-set destination, waypoint, or other point of interest; activation of a hover mode of the aircraft 100; or a speed of descent of the aircraft 100.

As illustrated in FIG. 2, in some embodiments of the invention the aircraft 100 may be an airplane 202 or other fixed-wing aircraft. The airplane 202 may include a fuselage 204, a set of wings 206, and a tail 208. The airplane 202 may also include the set of proximity sensors 110 (labeled in FIG. 2 as 210.1-210.N). The set of proximity sensors 110 may be disposed around the airplane 202 and interface with the pilot interface device 114 to assist in the detection of the obstacle 112. For example, proximity sensor 210.1 may be installed in a nose of the fuselage 204, proximity sensors 210.2 and 210.3 may be installed at opposing ends of the set of wings 206, and proximity sensors 210.4-210.N may be installed in the tail 208.

As with FIG. 1, it should be appreciated that the number and location of the proximity sensors 110 illustrated in FIG. 2 is merely exemplary. More or fewer proximity sensors 110 may be utilized and may be installed in other configurations. For example, the set of proximity sensors 110 may include an upper array and a lower array (not illustrated). The upper array is disposed on a top side of the aircraft 100 to detect obstacles 112 around and above the aircraft 100. The lower array is disposed on a bottom side of the aircraft 100 to detect obstacles 112 around and below the aircraft 100. Each respective array includes a plurality of proximity sensors 110 located adjacent so as to easily overlap and reduce wiring required to reach the ends of the aircraft 100.

In other embodiments, not illustrated, at least one external sensor that is disposed separate from the aircraft 100. In these embodiments, the obstacle detection is performed at least in part by off-board, external systems such as ground-based radar systems, ground-based proximity sensors (such as at an airport or other location), and/or the set of proximity sensors 110 of a different aircraft 100. For example, data from an air traffic control system may be received and interpreted as an obstacle 112. As another example, two aircraft 100 in proximity to one another may share information indicative of detected obstacles 112. This may allow the receiving aircraft to avoid obstacles beyond its sensor range. This may also allow two aircraft 100 simultaneously detecting the same obstacle 112 to calculate a more complete size and shape for the obstacle 112. Therefore, embodiments of the invention may receive information in real time over a data link and use it for display and threat estimation, as discussed below. The information can include location, size, shape, velocity of the obstacle 112 along with sensor position and velocity information.

Exemplary Display

Figure 3A:
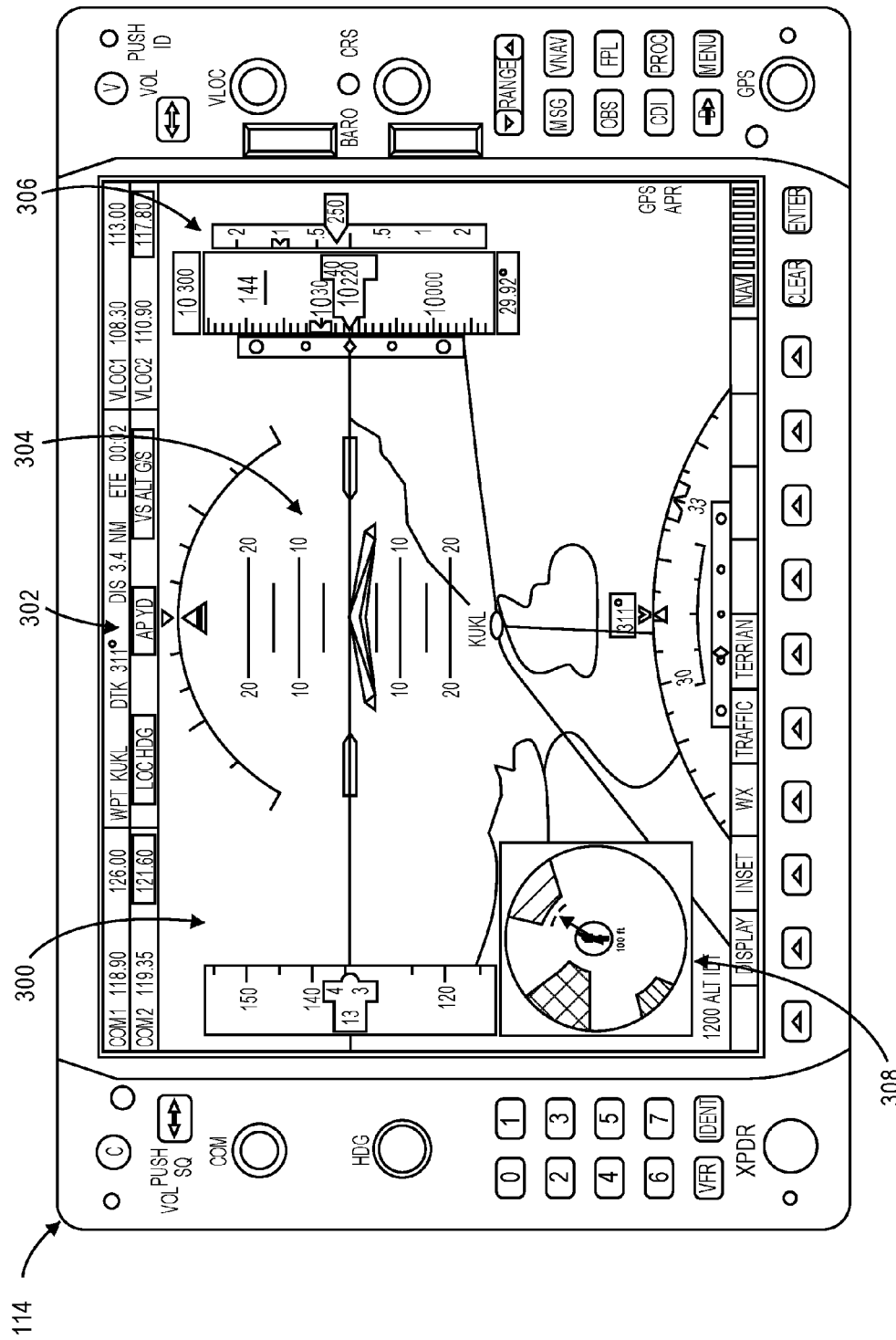
FIG. 3A is an illustration of a pilot interface device including a primary flight display thereon.

FIG. 3A illustrates an exemplary flight display 300 of the pilot interface device 114. It is to be understood that any information presented on exemplary flight display 300 of the pilot interface device 114 may be presented on a display of a mobile device (e.g., tablet, cellular phone, etc.) or a head-mounted display (e.g., Garmin Varia Vision™ in-sight display) in wireless communication with pilot interface device 114.

The flight display may include a graphical depiction of a control settings display 302, an attitude display 304, an altitude display 306, and an obstacle display 308. The flight display 300 provides an overall view of the current situation of the aircraft 100. The control settings display 302 includes information indicative of various control settings and other aircraft parameters. The attitude display 304 includes an artificial horizon or other indication of the current attitude of the aircraft relative to the ground or other landmark. The altitude display 306 includes an indication of the current altitude of the aircraft 100 as well as rates of change in altitude, air speed, approach and hover conditions, and other related information.

In embodiments of the invention, the pilot interface device 114 displays the obstacle display 308, such as via an overlay, on the primary flight display 300. In some embodiments, the obstacle display 308 may be disposed in a pop-up window on the primary flight display 300, in a permanent window on the primary flight display 300, in a cellular phone, in a heads-up display ("HUD"), in a head-mounted display or a helmet mounted display ("HMD"), in a multi-function display ("MFD"), in a dedicated display, or in another display in wireless communication with pilot interface device 114.

In some embodiments of the invention, the obstacle display 308 is displayed while the set of proximity sensors 110 is operating (such as when triggered by a detected movement of the aircraft, a location of the aircraft relative to an airport, a location of the aircraft relative to a pre-set destination, activation of a hover mode of the aircraft, or a speed of descent of the aircraft). In other embodiments, the obstacle display 308 is displayed when an obstacle 112 is detected. In still other embodiments, the obstacle display 308 is permanently displayed while the aircraft 100 is operational and/or below a certain altitude. In some embodiments, the pilot may manually select to view the obstacle display 308 when desired. Upon a triggering event, the obstacle display 308 is shown on the respective display and may include an alert to the pilot (such as a visual and/or audio signal indicative that the obstacle display 308 is being shown).

Figure 3B:
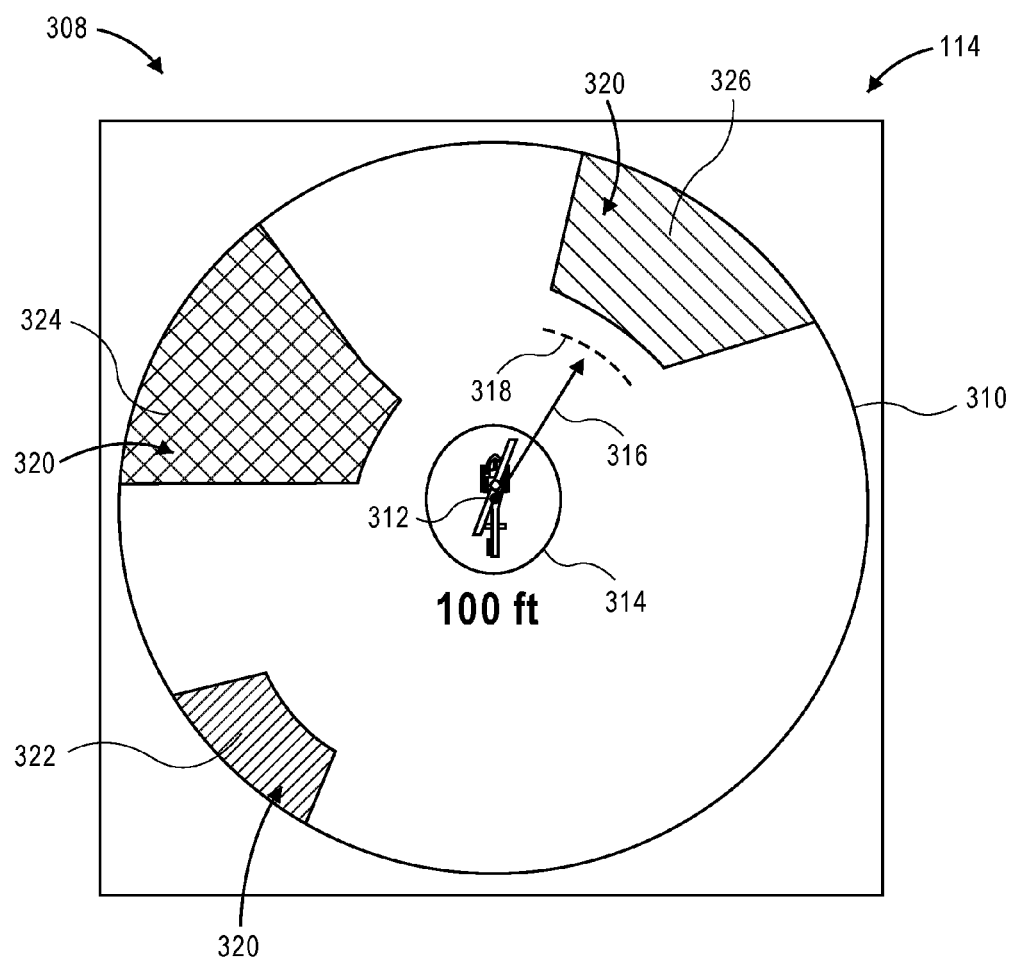
FIG. 3B is a detailed illustration of an exemplary graphical representation of an obstacle display that may be shown on the primary flight display of FIG. 3A.
Figure 4:
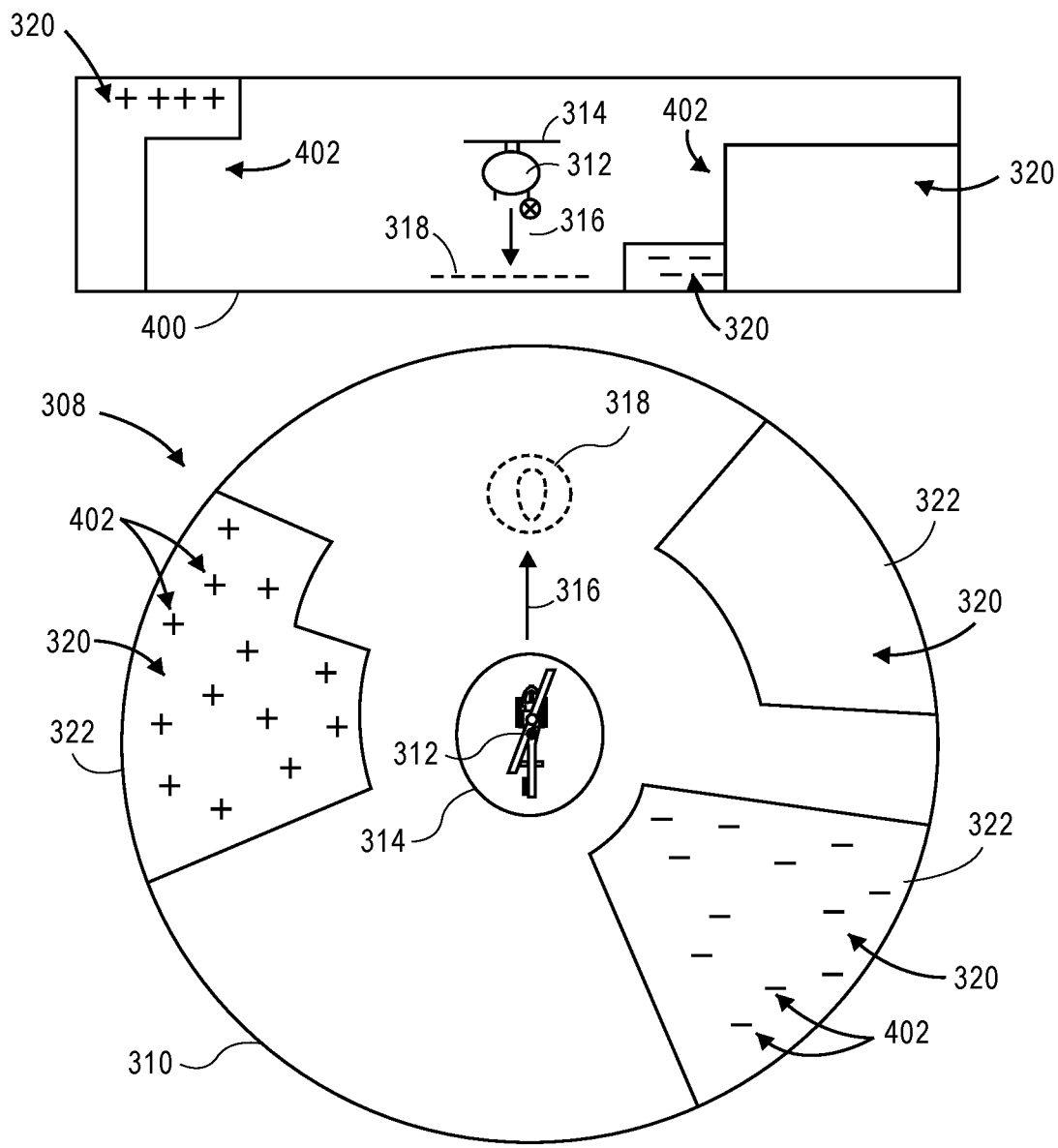
FIG. 4 is an illustration of another exemplary graphical representation of an obstacle display, showing both a plan view and a rear view.

It should also be appreciated that FIG. 3B and FIG. 4 illustrate exemplary displays and that various embodiments of the invention may include displays that look different than FIG. 3B and FIG. 4. The obstacle display 308 presents a simplified interface so as to clearly present information to the pilot of nearby obstacles 112 without providing excessive information. It should be appreciated that in other embodiments of the invention, the pilot interface device 114 is a dedicated screen for displaying the obstacle display 308 that is separate from the primary flight display 300. For example, the pilot interface device 114 may, in embodiments of the invention, be a smart phone or tablet computer that supplements the primary flight display 300.

In embodiments of the invention, the obstacle display 308 includes a proximity range 310 illustrating the proximity of the aircraft 100. For example, the proximity range 310 may be based upon an effective limit of the proximity sensors 110, a pre-determined range from the aircraft 100, a variable range from the aircraft 100 based upon the scale (as discussed below), or other range. This range may also be printed on the obstacle display 308 (such as the "100 ft" as illustrated in FIG. 3B) and expressed as either a radius or a diameter (or other measurement of the proximity range 310). In embodiments of the invention, such as illustrated in FIG. 3B, the proximity range 310 is generally circular. As discussed above, the set of proximity sensors 110 may be arrayed or otherwise directed generally around a perimeter of the aircraft 100. This allows for the detection of obstacles 112 in many directions (and in some embodiments, all directions). In these embodiments, the proximity range 310 may be generally circular, generally elliptical, or other similar shape. In other embodiments, the aircraft 100 may have limited coverage around the vehicle and/or the various proximity sensors 110 may have different ranges. In these other embodiments, the proximity range 310 may be another irregular shape.

In some embodiments of the invention, the proximity range 310 may include a depiction of the ground or water under the aircraft 100. The depiction of the ground may be a simple solid-color background, a depiction of map data, a depiction of a photograph or video feed taken by a camera of the aircraft 100, location information, altitude information, and the like. The depiction of the ground may also include TAWS displays and information. The depiction of the ground may also exclude the ground as an obstacle 112 if the ground is generally flat and include the ground as an obstacle 112 if the set of sensors detects protrusions or cavities in the ground. For example, the set of sensors may detect irregularities in the ground that cannot be observed by the pilot due to brush or other minor obstructions obscuring the pilots view. The obstacle display 308 may therefore supplement the TAWS displays and map data information to give the pilot a more detailed and correct depiction of the proximity of the aircraft 100. In some embodiments, detected obstacles 112 may be compared to the map data to determine if the detected obstacle 112 is the same as an obstacle indicated by the map data (such as a mountain top) or is not indicated in the map data (such as a building or other aircraft).

In embodiments of the invention, the obstacle display 308 includes an ownship icon 312 indicative of the aircraft 100, such as a helicopter 102 or an airplane 202 (not illustrated in FIG. 3B). The ownship icon 312 is a graphical representation of the aircraft 100 to orient the pilot as to the other displayed graphics. Typically, the ownship icon 312 is displayed as the aircraft 100 would be viewed from above, as illustrated in FIG. 3B. However, the ownship icon 312 may also be presented from other directions or orientations, including with perspective. The ownship icon 312 may include a safety perimeter 314 that may be indicative of the set of rotors 106, the set of wings 206, other aircraft components, or a general minimum safety distance. The safety perimeter may be displayed to scale with the ownship icon 312 or may be displayed as larger so as to provide an additional safety factor. The ownship icon 312 may also provide other information about the aircraft 100. For example, the ownship icon 312 may display the vehicle as pitched, rolled, and/or yawed, in accordance with the current attitude of the aircraft 100. In these embodiments, the obstacle display 308 may show an indication of the proximity of the aircraft 100 as viewed from above, not necessarily from the view of the pilot. As another example, the ownship icon 312 may illustrate a rotating set of rotors 106, a thrusting engine, or other illustration of the thrust and/or lift of the aircraft 100.

In some embodiments of the invention, the ownship icon 312 is displayed such that the nose of the aircraft 100 is oriented upward (relative to the obstacle display 308). This keeps the obstacle display 308 aligned with the aircraft 100. In other embodiments, the ownship icon 312 is displayed such that north, a course (e.g., an intended path of travel), or some other fixed or semi-fixed direction is up. This keeps the obstacles 112 and other displayed objects relatively static. In some embodiments, the pilot may switch between a nose-up and a north-up orientation as desired.

In embodiments of the invention, the obstacle display 308 includes a velocity vector icon 316 indicative of movement of the aircraft 100. The velocity vector may present an arrow shape or other shape indicative of the movement of the aircraft 100 (e.g., relative to the ownship icon 312). The velocity vector icon 316 may include a direction of movement and a magnitude of movement. The direction of movement is illustrated by the orientation of the velocity vector icon 316 relative to the aircraft 100. The magnitude of movement is illustrated by the length or size of the velocity vector icon 316, and/or by a text-based numeric label indicating the magnitude of movement. The magnitude of movement may be measure only in the horizontal plane illustrated by the obstacle display 308. The velocity vector icon 316 may also include an indication of upward and downward movement. Upward and downward movement may be shown in various ways, such by increasing and decreasing the size of an arrow end of the velocity vector, displaying text or other symbols, a circle with an "x" therein to show movement downward relative to the obstacle display 308 (as illustrated in FIG. 4) and a circle with a dot therein to show movement upward relative to the obstacle display 308, or other graphical representation.

The velocity vector icon 316 may include a projected position icon 318. The projected position icon 318 illustrates a predicted location in which the aircraft 100 will be located after a certain time lapse. For example, the projected position icon 318 may be displayed as a dashed arc in the projected location, as illustrated. As another example, the projected position icon 318 may be displayed as a dashed vehicle outline, as illustrated in FIG. 4. Thus, the projected position icon 318 is not a unitary, singular graphic in all embodiments and may comprise any graphic, representation, or other illustration. The projected position of the aircraft may be calculated based upon current flight dynamics and vehicle attitude and heading information, as discussed below.

The obstacle display 308 includes at least one obstacle graphic 320 indicative of the obstacle 112 detected by the set of sensors. The obstacle graphic 320 is a graphic, representation, or other illustration based upon the available information for the obstacle 112. The obstacle graphic 320 therefore provides the pilot with the available information about the obstacle 112 in an easy-to-read representation. It should be appreciated that, as used herein, "icon" and "graphic" may refer to any graphical representation of the respective information. An "icon" or a "graphic" may include graphics, pictures, photographs, words, numbers, symbols, lines, colors, opacity, cross-hatching, and other fill textures and visual representations of information. The "icon" or "graphic" may also change, alter, update, and delete as new information is obtained. For example, as an aircraft 100 moves past an obstacle 112, the set of sensors may detect multiple sides of the obstacle 112. As such, the size, shape, location, orientation, and other aspects of the obstacle graphic 320 may update as this new information is obtained (e.g., as the aircraft 100 moves relative to the obstacle 112). Similarly, if the aircraft 100 rises (or otherwise maneuvers) such that the obstacle 112 is no longer detected by the set of sensors, the obstacle graphic 320 may be removed from the obstacle display 308.

In embodiments of the invention, the obstacle graphic 320 is indicative of the distance and the direction to the obstacle 112. In some embodiments, the distance and direction to the obstacle 112 may be expressly shown on the obstacle display 308 (not illustrated). In some embodiments, the distance and direction may be implicitly displayed via the pilot's knowledge of the relative size and orientation of the aircraft 100. For example, the obstacle graphic 320 may be positioned relative to the ownship icon 312 such that the pilot can know the general direction and distance to the obstacle 112 based upon the relative scales. As such the pilot may look at the obstacle display 308 to avoid the obstacle 112 instead of (or in addition to) relying on direct observation of the obstacle 112. The obstacle graphic 320 may also be indicative of other known information about an obstacle, such as information from a TAWS database.

In some embodiments of the invention, the obstacle graphic 320 presents an annular arc-width indicative of the breadth of the obstacle 112. An annular arc-width is a portion of a ring-shaped segment of the proximity range 310. As discussed above, embodiments of the invention provide a distance, a direction, and a breadth of the obstacle 112. The annular arc-width displays the distance, direction, and breadth of the obstacle 112 in a single obstacle graphic 320. It should be appreciated that typically, the set of proximity sensors 110 does not detect a back side of the obstacle 112 or other sides of the obstacle 112. (e.g., the set of proximity sensors 110 can only detect the edge or side of the obstacle 112 nearest to the aircraft 100). The annular arc-width may therefore extend to an outer edge of the proximity range 310. However, in some embodiments, the set of proximity sensors 110 may be able to detect multiple sides of the obstacle 112. For example, if the aircraft 100 is descending, a proximity sensor on the underside of the aircraft 100 may be able to detect a back side of the obstacle 112, such that the obstacle graphic 320 does not extend to the outer edge of the proximity range 310. In these instances, the set of proximity sensors 110 may detect the distance, direction, breadth, and length of the obstacle 112.

It should be appreciated that in embodiments of the invention, the ownship icon 312 and the obstacle graphic 320 are to scale. As used herein "to scale" means that the graphical representation of the ownship icon 312 is substantially or approximately scaled with the graphical representation of the obstacle graphic 320. By showing the ownship icon 312 and the obstacle graphic 320 to scale, the obstacle display 308 provides spatial awareness for the pilot. For example, in FIG. 3B the pilot would be aware that the obstacle graphic 320 in the upper right is approximately one aircraft length away from the aircraft 100, and that the aircraft 100 is moving toward that obstacle 112. This provides the pilot with the information to avoid the obstacle 112 such as by steering around or over the obstacle 112. The obstacle display 308 may also dynamically scale the ownship icon 312 and the obstacle graphic 320 to provide a pilot with a view of potentially relevant obstacles 112. For example, if the pilot has zoomed in the display so as to show to show a reduced area proximity range 310, the obstacle display 308 may automatically expand the proximity range 310 to show a new obstacle graphic 320 or an obstacle graphic with a high threat level.

It should also be appreciated that the obstacle display 308 may illustrate more than one obstacle graphic 320 simultaneously. For example, as illustrated in FIG. 3B, the obstacle display 308 illustrates three separate obstacle graphics 320. Illustrating multiple obstacle graphics 320 allows the pilot to avoid an obstacle 112 without colliding or being threatened by another obstacle 112. Returning to the example of FIG. 3B, the pilot may decide to stop moving in a forward-starboard direction and instead move in a rearward-starboard direction so as to avoid the three obstacles 112. The pilot may also decide to rapidly ascend so as to avoid the obstacle 112 in the upper-right.

In embodiments of the invention, the obstacle graphic 320 may be displayed on a synthetic vision display, such as the altitude indication 304 as illustrated on the flight display 300 of FIG. 3A and/or as 2D or 3D graphics integrated with the other 3D displayed elements of the synthetic vision display. A synthetic vision display shows terrain and other landmarks in their proximity to the aircraft 100. The synthetic vision display shows the terrain as it appears from the pilot's perspective. This may include depictions of terrain and other landmarks below the pilot's field of view. The synthetic vision display may also assist the pilot in low-visibility situations, such as at night or in cloudy conditions. The obstacle graphic 320 may be shown on the synthetic vision display so as to supplement the map data and other data that is typically displayed on the synthetic vision display. It should be appreciated that in embodiments of the invention, the obstacle graphic 320 may only display the known parameters of the obstacle 112, such as the distance, the breadth, the altitude, and other parameters. As such, the obstacle graphic 320 may be displayed on the synthetic vision display as indicative of these parameters. In other embodiments, the system may include a camera for taking a picture or video of the obstacle 112 (based upon the known parameters) and displaying this picture or video on the synthetic vision display. The display of the picture or video may provide information of the nature of the obstacle 112.

In embodiments of the invention, the obstacle graphic 320 presents a threat indication based upon a threat level posed by the obstacle 112. The threat level is calculated based upon the available information about the aircraft 100 and the obstacle 112. In some instances, the threat level is essentially an expression of the likelihood that the aircraft 100 will collide with the obstacle 112. For example, based upon the current direction and magnitude of the velocity vector of the aircraft 100 may be compared to the distance, direction, breadth, relative altitude, and other size information about the obstacle 112.

The threat level may therefore be determined by the likelihood that the aircraft 100 will strike the obstacle 112 on that current velocity vector. This determination may also include the ability of the aircraft 100 to avoid the obstacle 112 given the current movement dynamics and controls. For example, if the pilot only has a few seconds before the obstacle 112 can be avoided, this may be assigned a very high threat level. The threat level may also be determined by the likelihood that the pilot will alter the velocity vector such that the aircraft 100 will strike the obstacle 112. For example, if the aircraft 100 is moving generally forward and slowly descending, the threat level may be high for obstacles 112 directly below as it is likely that the pilot may cease traveling generally forward and travel straight downward. In some instances, the threat level is essentially an expression of the danger posed by the obstacle 112. For example, obstacles 112 that are outside of the pilot's visual range may have a higher threat level than obstacles 112 within the pilot's visual range (all other factors being equal). This is because the pilot is likely more aware of obstacles 112 the pilot can see than obstacles 112 that are behind or below the aircraft 100. These unseen obstacles 112 therefore present a higher threat level because the pilot may not be aware of them without the obstacle display 308. In some instances, the threat level is a combination of multiple factors to determine the overall threat posed to the aircraft 100 by the obstacle 112. The threat level may also be calculated based upon the known size, shape, and orientation of the aircraft 100 (along with any associated safety distances which the aircraft 100 should remain away from obstacles 112 for safe flight).

The threat level may be expressed in any of several forms. A first example form is a numerical value. The numerical value could be expressed as a percentage (e.g., 0% to 100%), a real number (e.g., 1 to 10), a probability (e.g., 1:10, 1:100), or other numerical value. The numerical value may also be a summation of factors with no theoretical maximum or theoretical minimum. A second example form is an alphabetical string. The alphabetical string could be expressed as a word (e.g., "low," "high," "danger"), a letter grade (e.g., "A," "B," "C"), a description of the obstacle 112 (e.g., "below aircraft," "steep rise," "behind aircraft"), or other text-based description of the threat. A third exemplary form of the threat level may be a color system in which red is a high threat and green is a low- or no-threat (intermediate values being on the color spectrum between red and green), or other color-based scale.

A fourth exemplary form of the threat level is a simple threat/non-threat designation. The threat/non-threat designation is a binary determination that states whether the processor calculates the obstacle 112 to be a threat to the aircraft 100 or not. One example of the threat/non-threat designation is illustrated in FIG. 3B. The obstacle graphics 320 may include a non-threat designation 322, a potential-threat designation 324, or an actual-threat designation 326. The non-threat designation 322 is indicative that the obstacle 112 does not currently nor is it likely to pose a threat to the aircraft 100. For example, if the obstacle 112 is behind a fixed-wing aircraft, this obstacle 112 may be determined to be a non-threat because the fixed-wing aircraft cannot immediately collide with the obstacle 112. The potential-threat designation 324 is indicative that the obstacle 112 does not currently but could pose a threat to the aircraft 100 based upon a change in velocity vector. For example, if the obstacle 112 would pose an actual threat to the aircraft 100 upon the pilot making a non-drastic change in heading or change in altitude, the processor may determine a potential-threat designation 324 for the obstacle 112. The actual-threat designation 326 is indicative that the obstacle 112 currently poses a threat to the aircraft 100 based upon the velocity vector. The actual threat may be that the aircraft 100 will collide with obstacle 112, that the aircraft 100 will pass within the safety perimeter 314 or other safety factor distance, the obstacle 112 will be not visible to the pilot, that the obstacle 112 is moving relative to the ground or other obstacles 112, or that the obstacle 112 is posing some other threat to the aircraft 100.

In embodiments of the invention, the threat level may be determined in a one exemplary form and expressed in another exemplary form. For example, the processor may determine a numeric value for the threat level and display the threat level to the pilot using a color. To further the example, if the numeric value is under a low threshold, the threat level may be assigned the color green (for a non-threat designation 322); if the threat level is at or above the low threshold but below a high threshold, the threat level may be assigned the color yellow (for a potential-threat designation 324); and if the threat level is above the high threshold, the threat level may be assigned the color red (for an actual-threat designation 326). In some embodiments, two or more exemplary forms may be used to express the threat level, or to express different aspects of the threat level. As an example, an obstacle 112 with an actual-threat designation 326 that is at a relative altitude above the aircraft 100 may be displayed with a red color and "+" symbols, while an obstacle 112 with a potential-threat designation 324 that is at a relative altitude below the aircraft 100 may be displayed with a yellow color and a "−" symbol.

Returning to FIG. 3B, the threat level may be presented on the obstacle graphic 320. An obstacle graphic 320 with an actual-threat designation 326 may be a first color (such as red), an obstacle graphic 320 with a potential-threat designation 324 may be a second color (such as yellow), and an obstacle graphic 320 with a non-threat designation 322 may be a third color (such as green). It should be appreciated that FIG. 3B utilizes various cross-hatching to demonstrate that the various obstacle graphics 320 may be of different colors. In some embodiments, cross-hatching, opacity, and/or other indications may also be utilized to demonstrate the threat level.

In some embodiments of the invention, the obstacle display 308 may include a recommended evasive maneuver to the pilot based upon the calculated threat level. The obstacle graphic 320 may include an indication of the recommended course correction to avoid the obstacle (such as movement upward, downward, to port, to starboard, or stopping). The recommended course correction may be based upon the known parameters of the obstacle 112 as well as known parameters of the aircraft 100 current flight characteristics and control capabilities of the aircraft based upon those flight characteristics. For example, a helicopter taking off in an urban environment may not have sufficient clearance to move between two certain buildings (or obstacles 112 as detected by the set of proximity sensors 110). The obstacle graphics 320 indicative of these buildings may therefore provide an indication that the pilot should fly over the buildings rather than between them. As another example, an airplane 202 may detect an obstacle 112 below the airplane 202 and recommend that the pilot increase altitude to increase the safe clearance of the obstacle 112.

Figure 3C:
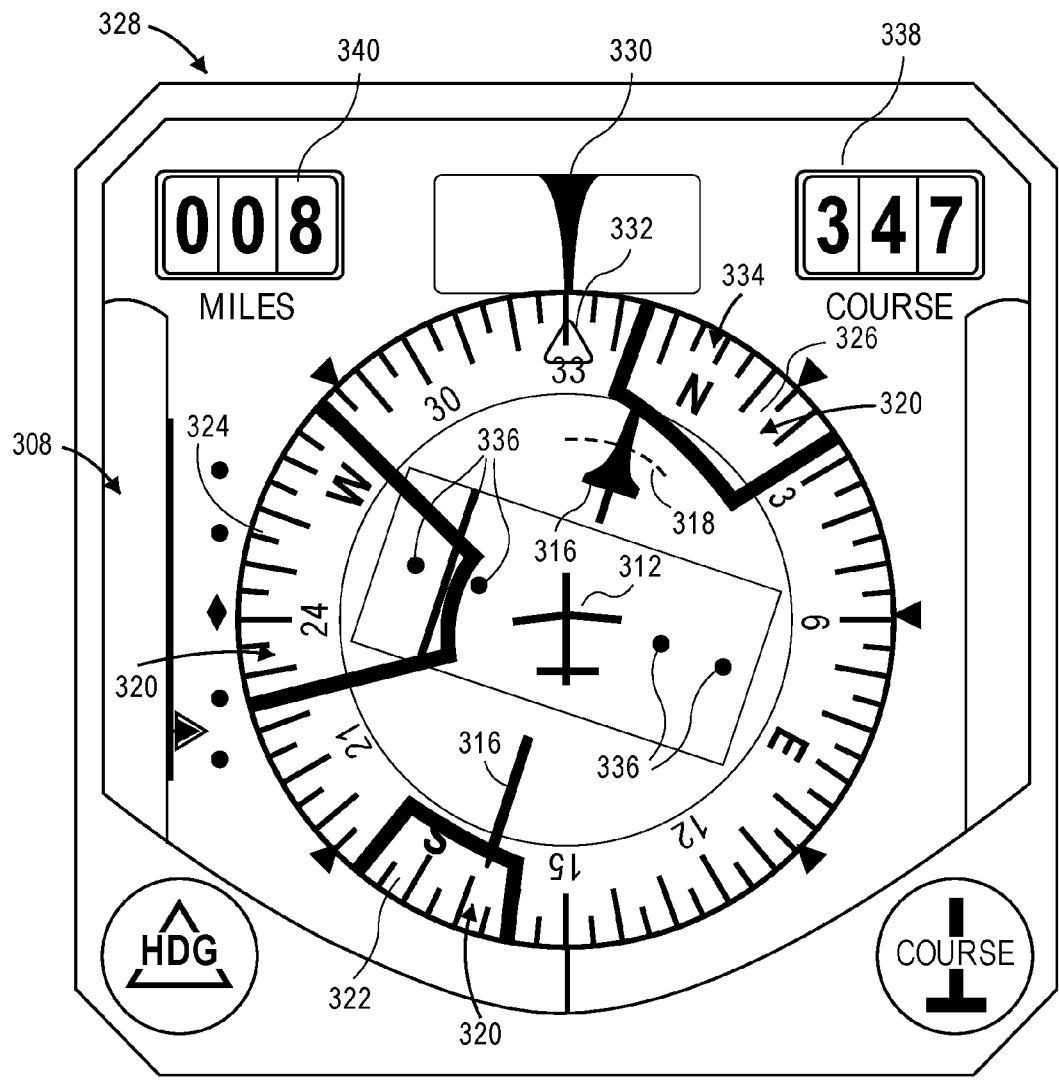

FIG. 3C illustrates an obstacle display 308 being overlaid on a horizontal situation indicator 328. The horizontal situation indicator 328 may be a component of the primary flight display 300, or on a stand-alone dedicated display for the horizontal situation indication 328. The horizontal situation indicator 328 provides the pilot with a representation of various attitude and course information so as to assist the pilot with remaining along a desired course. The horizontal situation indicator 328 may include a lubber line 330, a heading indication 332, a cardinal direction indication 334, a course deviation indication 336, a current course indication 338, and a mileage indication 340. The lubber line illustrates a straight-forward direction of the aircraft 100. The heading indication 332 indicates the desired heading for the aircraft 100. The cardinal direction indication 334 may include a plurality of marks indicative of cardinal directions (such as North, East, South, and West) as well as intermediate degree indications therebetween. Typically, the cardinal direction indication 334 is oriented to either magnetic North or true North. The course deviation indication 336 provides a representation of a lateral position of the aircraft relative to the course. The course deviation indication 336 therefore indicates the direction to turn and the magnitude of a turn to move the aircraft 100 to the course.

As illustrated in FIG. 3C, the horizontal situation indicator 328 may also include an ownship icon 312, a velocity vector 316, a projected position indication 318, and at least one obstacle graphic 320. The horizontal situation indicator 328 may therefore be presenting alternatively to the obstacle display 308, in embodiments of the invention. The ownship icon 312, velocity vector 316, projected positions indication 318, and obstacle graphics 320 therefore add the above-discussed features of the obstacle display 308 to the horizontal situation indication 328. The obstacle graphic 320 may be displayed as a bolded line (as illustrated in FIG. 3C), a color-filled shape, a semi-transparent shape, or the like.

FIG. 4 illustrates another exemplary embodiment of the obstacle display 308. The obstacle display 308 of FIG. 4 includes both a top-down view proximity range 310 (similar to the obstacle display 308 of FIG. 3B) and a side-view proximity range 400. The dual proximity range 310,400 provides the pilot with a more three-dimensional view of the aircraft 100 relative to the obstacles 112. In some embodiments, the pilot may be able to selectively enable the side-view proximity range 400 for viewing in certain situations. The pilot may also be able to selectively view the side-view proximity range 400 from a back-to-front orientation (as illustrated in FIG. 4) or an aircraft-side orientation. The system may automatically determine the optimal orientation based upon the location of obstacles 112 relative to the aircraft 100. If, as illustrated in FIG. 4, the obstacles 112 are primarily to the sides of the aircraft 100, the obstacle display 308 may show the back-to-front orientation. If instead the obstacles 112 are primarily behind or in front of the aircraft 100, the obstacle display 308 may show the aircraft-side orientation. The pilot may also be presented with an option to switch therebetween.

In these embodiments, the obstacle display 308 may include the obstacle graphic 320 presenting a relative altitude indication 402 to show whether the obstacle 112 is above or below the aircraft 100. In the top-down view proximity range 310 the relative altitude indication may be illustrated by a "+" symbol, an upward arrow, or other symbol overlaid on the obstacle graphic 320 for obstacles 112 above or at least partially above the aircraft 100; and a "−" symbol, a downward arrow, or other symbol overlaid on the obstacle graphic 320 for obstacles 112 below or at least partially below the aircraft 100. Other indications, such as colors, cross-hatching, words, or the like, may additionally or alternatively be utilized to present the relative attitude indication. In the side-view proximity range 400, the obstacle graphic 320 may be displayed with the relative altitude according to its relative altitude to the aircraft 100, as well as the above-discussed indications.

In embodiments of the invention, other information may be calculated and displayed to the pilot. For example, the obstacle display 308 may include a projected landing location icon to demonstrate where the aircraft 100 will land based upon the current flight characteristics. This can assist the pilot in ensuring that the aircraft 100 will not collide with the obstacles 112. As another example, the obstacle display 308 may show a calculated safe egress path. The safe egress path is calculated to reduce the threat level presented by the obstacle 112 or obstacles 112. The safe egress path is displayed to the pilot as a suggested path to follow for avoiding the obstacles 112. Other information presented on the obstacle display 308 may include a joystick position indicator, a power indicator, a thrust indicator, a climb/fall rate indicator, and the like.

In some embodiments of the invention, aspects of the above-discussed graphics may be integrated into other aircraft 100 depiction programs and systems. For example, the obstacle graphics 320 may be integrated into an airport area depiction "safe taxi" program that assists the pilot in taxiing at an airport. As another example, the obstacle graphics 320 may be integrated into a runway awareness and alerting system that monitors the flight characteristics in relation to the runway. The obstacle graphics 320 integrated into the runway awareness and alerting system may assist in avoiding other aircraft, surface vehicles, debris, and animals on or near the runway. As another example, the obstacle graphics 320 of actually detected obstacles 112 may be added to a TAWS display to supplement the map data and location data.

Exemplary Hardware Components of the Obstacle Avoidance System

Figure 5:
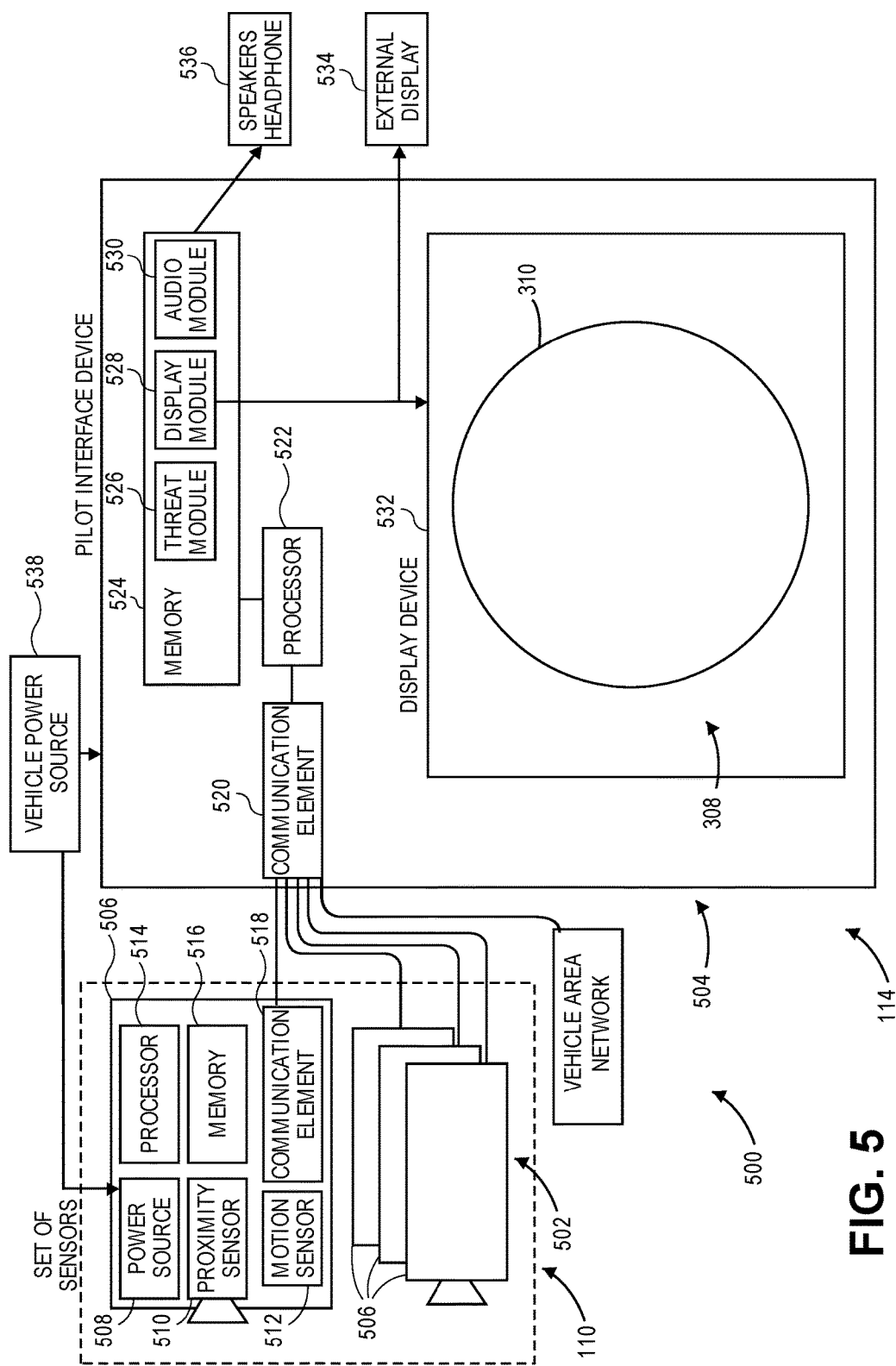
FIG. 5 is a schematic diagram illustrating various hardware components of the set of proximity sensors and the pilot interface device.

FIG. 5 illustrates an exemplary obstacle avoidance system 500. The obstacle avoidance system may include the set of proximity sensors 110 (labeled as 502 in FIG. 5) and the pilot interface device 114 (labeled as 504 in FIG. 5). Generally, the set of proximity sensors 110 detect the obstacles 112 and the pilot interface device 114 displays the obstacles 112 so that the pilot can avoid the obstacles 112. The set of proximity sensors 110 is communicatively coupled to the pilot interface device 114 such that information indicative of the detected obstacles 112 is transmitted to the pilot interface device 114.

The set of proximity sensors 110 includes at least one proximity sensor unit 506. The proximity sensor unit 506 is installed on, in, or adjacent to the aircraft 100 such that the proximity sensor unit 506 can detect obstacles 112 in the proximity to the aircraft 100 (and, more specifically, in proximity to the proximity sensor). Some exemplary components of the proximity sensor unit 506 are illustrated schematically in FIG. 5. In embodiments of the invention, the proximity sensor unit 506 comprises a power source 508, a proximity detection element 510, a motion sensor 512, a processor 514, a memory 516, and a communications element 518. In other embodiments, the proximity sensor unit 506 comprises the proximity sensor element, the processor 514, and the communications element 518. It should be appreciated that some embodiments of the proximity sensor unit 506 may incorporate similar features, components, techniques, and structures as the subject matter disclosed in commonly assigned U.S. patent application Ser. No. 15/005,422, filed Jan. 25, 2016, and titled "PROXIMITY DETECTION SYSTEM." The above-mentioned patent application is hereby incorporated by reference in its entirety into the present application.

In some embodiments of the invention, the proximity sensors 110 may be characterized as altimeter radars, supplementary radars, infrared light cameras, visual light cameras, laser rangefinders, sonar sensors, ultraviolet detectors, or other type of proximity sensor. In some embodiments, the set of proximity sensors 110 may include more than one type of proximity sensor, so as to provide a more diverse detection of obstacles 112 around the aircraft 100. For example, the set of proximity sensors 110 may include a set of downward-oriented, long-range altimeter radars for determining obstacles on the ground during flight and a set of laterally-oriented, short-range supplementary radars for determining obstacles around the aircraft during ground movement and low-altitude flight.

The pilot interface device 114 is configured to receive an obstacle indication from the set of proximity sensors 110. Upon a detection of a reflected signal by the proximity detection element 510, the processor 514 of the proximity sensor unit 506 may then analyze the reflected signal to determine various characteristics of the obstacle 112 as indicated by the reflected signal, via a computer program stored on the memory 516 (being a non-transitory computer readable storage medium). The processor 514 sends an indication of the obstacle data (as either raw reflected signal information, analyzed obstacle indications, or both) to a communications element 520 of the pilot interface device 114 via the communications element 518 of the proximity sensor unit 506. In some embodiments of the invention, the pilot interface device 114 is the primary flight display 300, as illustrated in FIG. 3A. In other embodiments of the invention, the pilot interface device 114 is a standalone device, as illustrated in FIG. 5. In still other embodiments of the invention, the pilot interface device 114 is a standalone device, as illustrated in FIG. 5, that may additionally or optionally interface with a primary flight display 300, as illustrated in FIG. 3A, or other flight display (such as during a determination that an obstacle 112 poses a high threat level).

The communications element 520 permits the pilot interface device 114 to send and receive data between different devices (e.g., the set of proximity sensors 110, components, peripherals, and other aircraft system) and/or over the one or more networks. The communications element 520 includes one or more Network Interface Units. NIU may be any form of wired or wireless network transceiver known in the art, including but not limited to networks configured for communications according to the following: one or more standards of Aeronautical Radio, Incorporated (ARINC); one or more standards of the Garmin International avionics network (GIA), such as a High Speed Data Bus (HSDB); and the like. Wired communications are also contemplated such as through universal serial bus (USB), Ethernet, serial connections, and so forth. Pilot interface device 114 may include multiple NIUs for connecting to different networks or a single NIU that can connect to each necessary network.

The communications element 520 may also have a wired and/or wireless connection to the set of proximity sensors 110 and/or a vehicle-area network (VAN) for the aircraft 100 in which it is used. The pilot interface device 114 may include a primary flight display 300 or other multifunction display. The pilot interface device 114 may display information received from the pilot interface device 114 for the pilot. The VAN may connect various aircraft systems, such as the set of proximity sensors 110, an attitude and heading reference system (AHRS), a flight management system, a terrain awareness and warning system (TAWS), a flight control system, global positioning systems, radios/satellites and other external communication devices, and vehicle (i.e., aircraft) controls, it may also be referred to as a Controller Area Network (CAN). In some embodiments, the pilot interface device 114 may automatically take evasive maneuvers to avoid colliding with the obstacle 112. In these embodiments, the pilot interface device 114 may send commands or messages to the CAN. The VAN may also include one or more integrated displays and/or speakers for the pilot. When this is the case, pilot interface device 114 may not include its own display but instead use the aircraft's integrated display, or both. Alternatively, VAN may not integrate into the aircraft 100 itself, but rather connect peripherals and other devices installed in or used in the aircraft 100.

The pilot interface device 114 may also include a processor 522. The processor 522 provides processing functionality for the pilot interface device 114 and may include any number of processors, micro-controllers, or other processing systems, and resident or external memory for storing data and other information accessed or generated by the pilot interface device 114. The processor 522 may execute one or more software programs that implement the techniques and modules described herein. The processor 522 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the processor 522 of the pilot interface device 114 may be performed by the processor 514 of the proximity sensor unit 506 (and vice versa), or by other processors. Similarly, the described structure of the processor 522 may also describe corresponding structure on the processor 514 of the proximity sensor unit 506 (and vice versa).

The pilot interface device 114 may also include a memory 524. The memory 524 is an example of device-readable storage media that provides storage functionality to store various data associated with the operation of the pilot interface device 114, such as the software program and code segments discussed below, or other data to instruct the processor 522 and other elements of the pilot interface device 114 to perform the techniques described herein. A wide variety of types and combinations of memory may be employed. The memory 524 may be integral with the processor 522, a stand-alone memory, or a combination of both. The memory 524 may include, for example, removable and non-removable memory elements such as RAM, ROM, Flash (e.g., SD Card, mini-SD card, micro-SD Card), magnetic, optical, USB memory devices, and so forth. In embodiments of the pilot interface device 114, the memory 524 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The memory 524 may include at least one computer program thereon, as discussed in depth below. In embodiments of the invention, the computer program includes a threat module 526, a display module 528, and an audio module 530. The threat module 526 is operable to instruct the processor 522 to determine the threat level based upon the obstacle indication and the movement indication for the aircraft 100. The display module 528 is operable to instruct the processor 522 to display various information on a display device 532 associated with the pilot interface device 114. The display module 528 may additionally or alternatively instruct the processor 522 to display the information on an external display device 534. The audio module is operable to instruct the processor 522 to provide directional audio-cues to the pilot via speakers and/or headphone 536.

In embodiments of the invention, the pilot interface device 114 includes the display device 532 to present an obstacle display 308 to the pilot, as illustrated in FIGS. 3A, 3B, and 4 and discussed above. In embodiments, the display device 532 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light-Emitting Diode), and so forth, configured to display text and/or graphical information such as a graphical user interface. The display device 532 could also be a three-dimensional display, such as a holographic or semi-holographic display. The display device 532 may be backlit via a backlight such that it may be viewed in the dark or other low-light environments, as well as in bright sunlight conditions.

The display device 532 may be provided with a screen for entry of data and commands. In one or more implementations, the screen comprises a touch screen. For example, the touch screen may be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens may include surface capacitance touch screens, projected capacitance touch screens, mutual capacitance touch screens, and self-capacitance touch screens. The display device 532 may therefore present an interactive portion (e.g., a "soft" keyboard, buttons, etc.) on the touch screen. In some embodiments, the display device 532 may also include physical buttons integrated as part of pilot interface device 114 that may have dedicated and/or multipurpose functionality, etc. In other embodiments, the display device 532 includes a cursor control device (CCD) that utilizes a mouse, rollerball, trackpad, joystick, buttons, or the like to control and interact with the display device 532.

In some embodiments of the invention, the pilot may press or touch the obstacle graphic 320 to instruct display of more information about the obstacle 112. For example, the pilot may press on an actual-threat designation 326 to display additional information, such as the numerical value of the calculated threat level, a numerical value of the distance and direction, an estimated time to impact (if applicable), density information for the obstacle 112, and other obstacle characteristics. As another example, the pilot may press or touch the projection position icon to change the time lapse amount (e.g., from five seconds to ten seconds).

In some embodiments of the invention, the pilot may press or touch the obstacle graphic 320 to instruct an autopilot system or a flight management system to evade the obstacle 112. The autopilot system or flight management system may then calculate a desired path to safely avoid the obstacle 112 and provide instructions to servos and other flight control systems to achieve the desired path.

The external display device 534 may be the primary flight display 300. For example, the discussed graphics may be displayed in, over, or near the horizontal situation indicator (HSI) compass, as illustrated in FIG. 3A. The HSI compass is typically centrally located near the pilot's line of sight. As another example, the discussed graphics may be displayed on an inset map of the primary flight display as inset map functionality may be of a lower priority while obstacles 112 are near the aircraft 100.

In embodiments of the invention, the various components of the obstacle avoidance system interface with a vehicle power source 538. In some embodiments, the power source 508 of the proximity sensor unit 506 is a source independent of the aircraft 100, such as batteries. In other embodiments, power source 508 is an external power adapter receiving power from a vehicular power source 538 providing AC or DC power and, if necessary, transforming it appropriately for use by the proximity sensor unit 506. As an example, power source in such embodiments is a cable coupled with the proximity sensor unit 506 and the vehicular power source 538 to provide power to the device.

Example Procedures

The following discussion describes procedures that can be implemented in a pilot interface device 114. The procedures can be implemented as operational flows in hardware, firmware, software, or a combination thereof. These operational flows are shown below as a set of blocks that specify operations performed by one or more devices and are not necessarily limited to the orders shown for performing the operations by the respective blocks. The features of the operational flows described below are platform-independent, meaning that the operations can be implemented on a variety of device platforms having a variety of processors.

Figure 6:
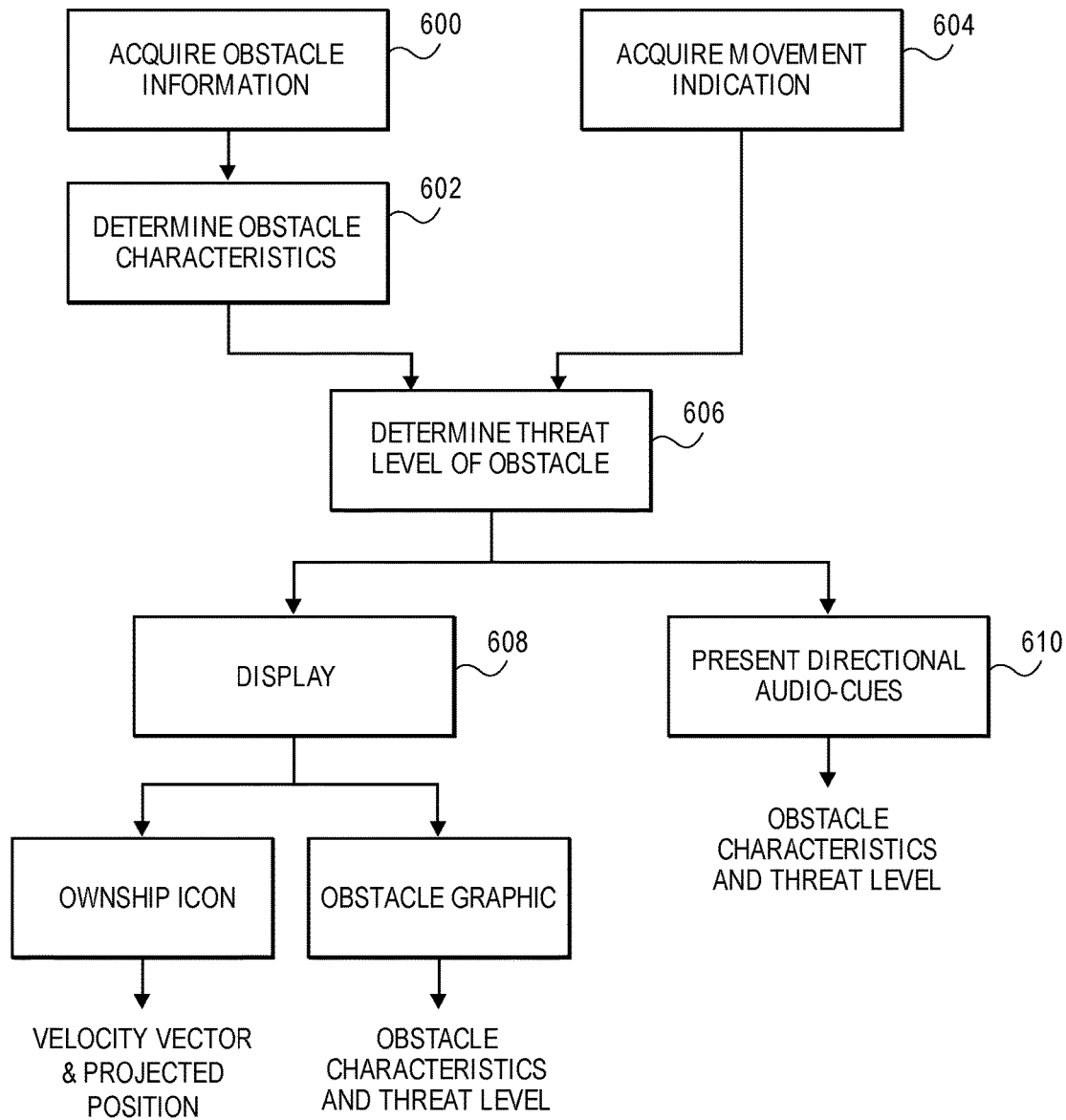
FIG. 6 is a flow diagram illustrating exemplary steps that may be performed in embodiments of the invention.

FIG. 6 presents a flowchart illustrating the operation of a method of presenting obstacle information to a pilot. While the various procedures and methods have been discussed throughout, general steps of the method will now be described. In embodiments of the invention, a computerized method is utilized for detecting and displaying obstacles in proximity to an aircraft. The method may comprise the following steps: acquiring an obstacle indication of the obstacle in proximity to the aircraft from a set of proximity sensors, wherein the obstacle indication includes a distance and a direction to the obstacle relative to the aircraft; receiving a movement indication associated with movement of the aircraft; determining a threat level posed by the obstacle; displaying an ownship icon indicative of the aircraft; displaying a velocity vector indicative of movement of the aircraft; and displaying an obstacle graphic indicative of the distance and the direction to the obstacle and the breadth of the obstacle, wherein the obstacle graphic presents a threat indication based upon the threat level posed by the obstacle.

In Step 600, obstacle information is acquired from the set of proximity sensors 110 or other external sensors. In some embodiments, the processor 522 may actively retrieve the obstacle information. In other embodiments, the processor 522 may passively receive the obstacle information. In some embodiments, the obstacle information is determined by the processor 522 associated with the proximity sensor and sent to the pilot interface device 114 as a message indicative of the obstacle or obstacles 112 detected. In other embodiments, the proximity sensor sends raw reading data to the processor 522 of the pilot interface device 114 for analysis. In some embodiments, the proximity sensor is continuously or substantially continuously providing reading information to the processor 514 while the proximity sensor is powered. In other embodiments, the proximity sensor is only sending obstacle information while the motion sensor 512 of the proximity sensor is detecting movement. In still other embodiments, the proximity sensor is only sending obstacle information when an obstacle 112 is detected. For example, if the aircraft 100 is flying at sufficient altitude that no obstacles 112 are detected, the proximity sensor may cease transmitting information. In still other embodiments, the proximity sensors 110 may be provided with power only while certain aircraft parameters or flight phases are active. For example, the proximity sensors 110 may be provided with power during hover, takeoff, landing, and low-altitude flight.

In Step 602, various obstacle characteristics are determined. These obstacle characteristics may include the distance, the direction, the breadth, relative velocity, and/or the relative altitude of the obstacle 112. The obstacle characteristics for a certain obstacle 112 may also include multiple sets of obstacle characteristics. For example, the obstacle characteristics may include a distance and a direction to a first corner of the obstacle 112, as well as a distance and a direction to a second corner of the obstacle 112. The obstacle characteristics may include a general shape of the obstacle 112, at least as to a near side of the obstacle 112. Another example of an obstacle characteristic may include a density of the obstacle 112. This may be advantageous for determining the threat posed by the obstacle 112. If the obstacle 112 has a very low density, the processor 522 may determine that the obstacle 112 has a low threat level. For example, if the set of sensors detects a bush on the ground, the helicopter 102 can likely land on the bush without any damage to the helicopter 102.

In Step 604, movement information is acquired. The movement information of the aircraft 100 may be acquired from various aircraft control systems. The movement information may include information from an AHRS, a TAWS, a flight management system, a flight control system, and/or other aircraft system. It should also be appreciated that embodiments of the invention are associated with the above-mentioned or other aircraft systems. In these embodiments, the movement indication may be received from the various sensor either internal or external to the aircraft system.

A projected position may also be calculated based upon the movement information. The projected position may be determined by the velocity vector of the aircraft 100, an acceleration vector of the aircraft 100, a desired course or flight path, a possible range of movements within the time lapse, or a combination thereof. The projected position may also be attitude and heading of the aircraft, engine and rotor parameters, hydraulic and electric system parameters, weather and temperature information, and other aircraft state information. The projected position can include a range of possible positions, a safety buffer, and other safety considerations. The projected position may also include a plurality of intermediate projected positions at a corresponding plurality of intermediate time lapses, a long-term projected position beyond the time lapse, or the like.

In Step 606, the threat level of the obstacle 112 is determined. The threat level is calculated based upon the available obstacle information and aircraft movement information. As discussed above, the threat level may be a numerical value that represents the likelihood of the aircraft 100 striking the obstacle 112 or other dangers posed by the obstacle 112, as discussed above.

In Step 608, the graphics (such as discussed above in regards to FIG. 3 and FIG. 4) on the pilot interface device 114 and/or other aircraft display device 534 (such as a heads-up display, a head-mounted visor display, a main aircraft display, or the like). The obstacle display 308 may include the ownship icon 312 and the obstacle graphic 320. As discussed above, the ownship icon 312 may include a velocity vector icon 316 and a projected position icon 318. The obstacle graphic 320 may include obstacle characteristics and an indication of the threat level. The obstacle display 308 may also include an indication of the ground, other objects, or other information. Upon receipt of a signal or message indicative that an obstacle has been detected, the processor 522 may generate the obstacle display 308 and present the obstacle display 308 to the pilot on any of various displays. The processor 522 may perform these steps automatically upon the detection of the obstacle 112, such that the pilot is given sufficient time to avoid the obstacle 112.

In Step 610, directional audio-cues are presented to the pilot. The directional audio-cues may be delivered via a cockpit speaker system, a pilot headset, a dedicated audio-cue speaker system, or other speaker system. Directional audio-cues provide information as to the obstacle characteristics and/or the threat level (e.g., "3D Audio"). For example, a directional audio-cue may include a beeping, audible message oriented in the general direction in which the obstacle 112 is located (or configured to be perceived by the pilot as being oriented in the direction of the obstacle 112). The distance to the obstacle 112 may be represented by a rate and/or a volume of the beeping. The threat level may also be represented by a rate and/or a volume of the beeping. The directional audio-cues may be initiated upon the threat level being over a certain threshold (such as the low threshold or the high threshold discussed above). The directional audio-cues may also include word strings and other spoken information. The word strings could include an advisory announcement upon the detection of the obstacle 112, an alert for the obstacle 112 based upon the threat level overcoming a certain threshold, or the like. These word strings may be pre-recorded, automatically generated, or the like.

In embodiments, one or more speakers and/or one or more lights (e.g., plurality of LEDs, LCD display, etc.) may be mounted to (or integrated within) an exterior surface of aircraft 100 to provide an audible and/or visual alert in the direction of any obstacle 112. For instance, an audible warning exceeding the sound generated by aircraft 100, such as the sound generated by set rotors 106 rotating, may be generated by the one or more speakers in the direction of obstacle 112 to enable person(s) identified as obstacle 112 or near obstacle 112 to take precautionary or corrective actions. Similarly, a visual warning (e.g., flashing light, indication of current direction of aircraft 100, etc.) may be provided be the one or more lights in the direction of obstacle 112 to enable person(s) identified as obstacle 112 or near obstacle 112 to take precautionary or corrective actions.

Generally, any of the functions described herein may be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the pilot interface device 114 of FIG. 1 may be wired, wireless, or some combination thereof. In the case of a software implementation, for instance, the module represents executable instructions that perform specified tasks when executed on a processor, such as the processor 522 of the pilot interface device 114. The program code may be stored in one or more device-readable storage media, an example of which is the memory 524 of the pilot interface device 114.

CONCLUSION

Although systems and methods for obstacle avoidance have been disclosed in terms of specific structural features and acts, it is to be understood that the appended claims are not to be limited to the specific features and acts described. Rather, the specific features and acts are disclosed as exemplary forms of implementing the claimed devices and techniques.

The invention claimed is:

1. An obstacle avoidance system operable to detect and display obstacles in proximity to an aircraft, the obstacle avoidance system comprising:
   a display;
   a communications element operable to receive an obstacle indication from one or more proximity sensors associated with the aircraft during flight of the aircraft, the aircraft having one or more rotor blades generating lift to hover and move the aircraft through the air in any direction,
   wherein the obstacle indication is associated with a signal reflected from an obstacle;
   a processor coupled with the display and the communications element, the processor operable to:
      acquire a distance and a direction to the obstacle from the aircraft based upon the obstacle indication,
      determine a relative altitude of the obstacle based upon the obstacle indication,
      determine a threat level posed by the obstacle to the aircraft,
      determine an obstacle display including an ownship icon and an obstacle graphic indicative of the distance and the direction to the obstacle from the aircraft, the obstacle graphic including a threat indication based upon the determined threat level posed to the aircraft by the obstacle and a relative altitude indication configured to indicate whether the obstacle is above or below the aircraft, and
      control the display to present the determined obstacle display.

2. The obstacle avoidance system of claim 1, wherein the system is operable to activate automatically upon at least one of a detected movement of the aircraft, a location of the aircraft relative to an airport, a location of the aircraft relative to a waypoint, activation of a hover mode of the aircraft, or a speed of descent of the aircraft.

3. The obstacle avoidance system of claim 1,
   wherein the processor is further operable to determine a breadth of the obstacle,
   wherein the obstacle graphic includes an annular arc-width indicative of the breadth of the obstacle.

4. The obstacle avoidance system of claim 1, wherein the threat indication is presented by a color that is indicative of the threat level posed by the obstacle.

5. The obstacle avoidance system of claim 1, wherein the threat indication is a potential-threat indication if the threat level posed by the obstacle is above a low threshold and below a high threshold.

6. The obstacle avoidance system of claim 1, wherein the threat indication is an actual-threat indication if the threat level posed by the obstacle is above a high threshold.

7. The obstacle avoidance system of claim 1, wherein the system is operable to generate a directional audio-cue indicative of the threat level posed by the obstacle and indicative of the distance and the direction to the obstacle.

8. The obstacle avoidance system of claim 1, wherein the processor is further operable to:
   determine a velocity vector icon indicative of movement of the aircraft in a direction; and
   determine a projected-position indication that is indicative of a projected location of the aircraft after a time lapse, and
   control the display to present the velocity vector icon and the projected-position indication.

9. The obstacle avoidance system of claim 1, wherein the signal is reflected from an obstacle located below the aircraft when the aircraft is descending.

10. The obstacle avoidance system of claim 9, wherein the determined threat level posed by the obstacle is high when the acquired direction to the obstacle is directly below the aircraft.

11. The obstacle avoidance system of claim 1, wherein the signal is reflected from an obstacle located above the aircraft when the aircraft is ascending.

12. The obstacle avoidance system of claim 1, wherein the processor is further configured to remove the obstacle graphic from the obstacle display when the distance and the direction to the obstacle from the aircraft cannot be acquired based upon the obstacle indication.

13. An obstacle avoidance system operable to detect and display obstacles in proximity to an aircraft, the obstacle avoidance system comprising:
- a pilot interface device;
- a set of proximity sensors associated with the aircraft during flight of the aircraft, the aircraft having one or more rotor blades generating lift to hover and move the aircraft through the air in any direction,
- wherein the set of proximity sensors is operable to emit a signal and receive a reflection of the signal from an obstacle;
- a processor coupled with the pilot interface device and the set of proximity sensors, the processor operable to:
  - receive an obstacle indication from the set of proximity sensors and detect the obstacle that is in proximity to the aircraft based at least in part on the reflected signal,
  - determine a distance and a direction to the obstacle,
  - calculate a threat level posed by the obstacle to the aircraft,
  - determine an obstacle display including an ownship icon and an obstacle graphic indicative of the distance and the direction to the obstacle from the aircraft and an altitude of an obstacle, and
  - control the pilot interface device to present the obstacle display.

14. The obstacle avoidance system of claim 13,
- wherein the pilot interface device is a flight display configured to be utilized by the pilot in flying the aircraft,
- wherein the ownship icon and the obstacle graphic are displayed on the flight display upon activation of a hover mode of the aircraft.

15. The obstacle avoidance system of claim 13,
- wherein the set of proximity sensors is operable to detect a relative altitude of the obstacle,
- wherein the obstacle graphic presents a relative altitude indication to show whether the obstacle is above or below the aircraft.

16. The obstacle avoidance system of claim 13,
- wherein the set of proximity sensors is operable to detect a breadth of the obstacle,
- wherein the obstacle graphic includes an annular arc-width indicative of the breadth of the obstacle.

17. The obstacle avoidance system of claim 13, wherein the obstacle graphic includes an indication of the determined distance and direction to the obstacle, and wherein the indication is associated with a color indicative of the distance and the direction to the obstacle.

18. The obstacle avoidance system of claim 13, wherein the system is operable to generate a directional audio-cue indicative of the distance and the direction to the obstacle.

* * * * *